United States Patent
Hung

(10) Patent No.: US 8,053,137 B2
(45) Date of Patent: Nov. 8, 2011

(54) PROTON EXCHANGE MEMBRANE FUEL CELL

(75) Inventor: Hsin-Chin Hung, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 311 days.

(21) Appl. No.: 12/412,620

(22) Filed: Mar. 27, 2009

(65) Prior Publication Data

US 2009/0325024 A1    Dec. 31, 2009

(30) Foreign Application Priority Data

Jun. 30, 2008 (CN) .......................... 2008 1 0302489

(51) Int. Cl.
*H01M 8/10* (2006.01)
*H01M 4/92* (2006.01)
*B01J 23/00* (2006.01)
*B01J 23/42* (2006.01)
*B01J 23/06* (2006.01)

(52) U.S. Cl. ........ 429/492; 429/483; 429/514; 429/524; 429/526; 429/528; 502/325; 502/339; 502/340; 502/343; 502/344; 502/349; 502/350; 502/352

(58) Field of Classification Search .......... 429/400–535; 502/300, 325, 339, 340, 343, 344, 349, 350, 502/352
See application file for complete search history.

(56) References Cited

U.S. PATENT DOCUMENTS

2005/0041276 A1* 2/2005 Beteille et al. ................. 359/245
2005/0106448 A1* 5/2005 Kanno et al. .................... 429/40

OTHER PUBLICATIONS

Park et al. "Photo(UV)-enhanced performance of Pt-TiO2 nanostructure electrode for methanol oxidation." Mar. 1, 2007. Electrochemistry Communications 9 (2007): 1578-1581.*
Yang et al. "In situ visualization study of CO2 gas bubble behavior in DMFC anode flow fields." Sep. 2, 2005. Journal of Power Sources 139 (2005): 79-90.*

* cited by examiner

*Primary Examiner* — Basia Ridley
*Assistant Examiner* — James Lee
(74) *Attorney, Agent, or Firm* — Altis Law Group, Inc.

(57) ABSTRACT

An exemplary proton exchange membrane fuel cell includes a light-pervious first end plate, a second end plate, a light-pervious first bipolar plate, a second bipolar plate, and a membrane electrode assembly. The light-pervious first bipolar plate is arranged adjacent to the first end plate and capable of transmitting light having a given wavelength therethrough. The second bipolar plate is capable of having oxidant fed therein. The membrane electrode assembly includes a proton exchange membrane, and an anode and a cathode arranged at opposite sides of the proton exchange membrane. The anode is capable of having fuel fed therein, and includes a first catalyst layer containing photo-catalyst and noble metal such that the light is capable of activating the first catalyst layer to dissociate the fuel thereon.

20 Claims, 2 Drawing Sheets

PROTON EXCHANGE MEMBRANE FUEL CELL

BACKGROUND

1. Technical Field

The present invention generally relates to fuel cells, and particularly to a proton exchange membrane fuel cell having high electric conversion efficiency.

2. Description of Related Art

A proton exchange membrane fuel cell is an electrochemical apparatus converting chemical energy into usable electric energy. The energy conversion occurs as a result of combination of a fuel (such as hydrogen or methanol) with an oxidant (such as pure oxygen or air containing oxygen). The proton exchange membrane fuel cell generally includes a membrane electrode assembly, two bipolar plates arranged at opposite sides of the membrane electrode assembly, and two end plates arranged at opposite sides of the bipolar plates. The membrane electrode assembly is comprised of an anode, a cathode, and a proton exchange membrane. In operation, a fuel is fed through one of the bipolar plates to the anode to be split into positive hydrogen ions (protons) and negatively charged electrons. The negatively charged electrons are forced to travel through a circuit, thus creating an electric current.

However, many proton exchange membrane fuel cells have low efficiency in splitting the fuel, which results in a low electric conversion efficiency.

What is needed, therefore, is an improved proton exchange membrane fuel cell which can overcome the limitations described.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present proton exchange membrane fuel cell. Moreover, in the drawings, like reference numerals designate corresponding parts throughout the several views.

DETAILED DESCRIPTION

Figure 1:
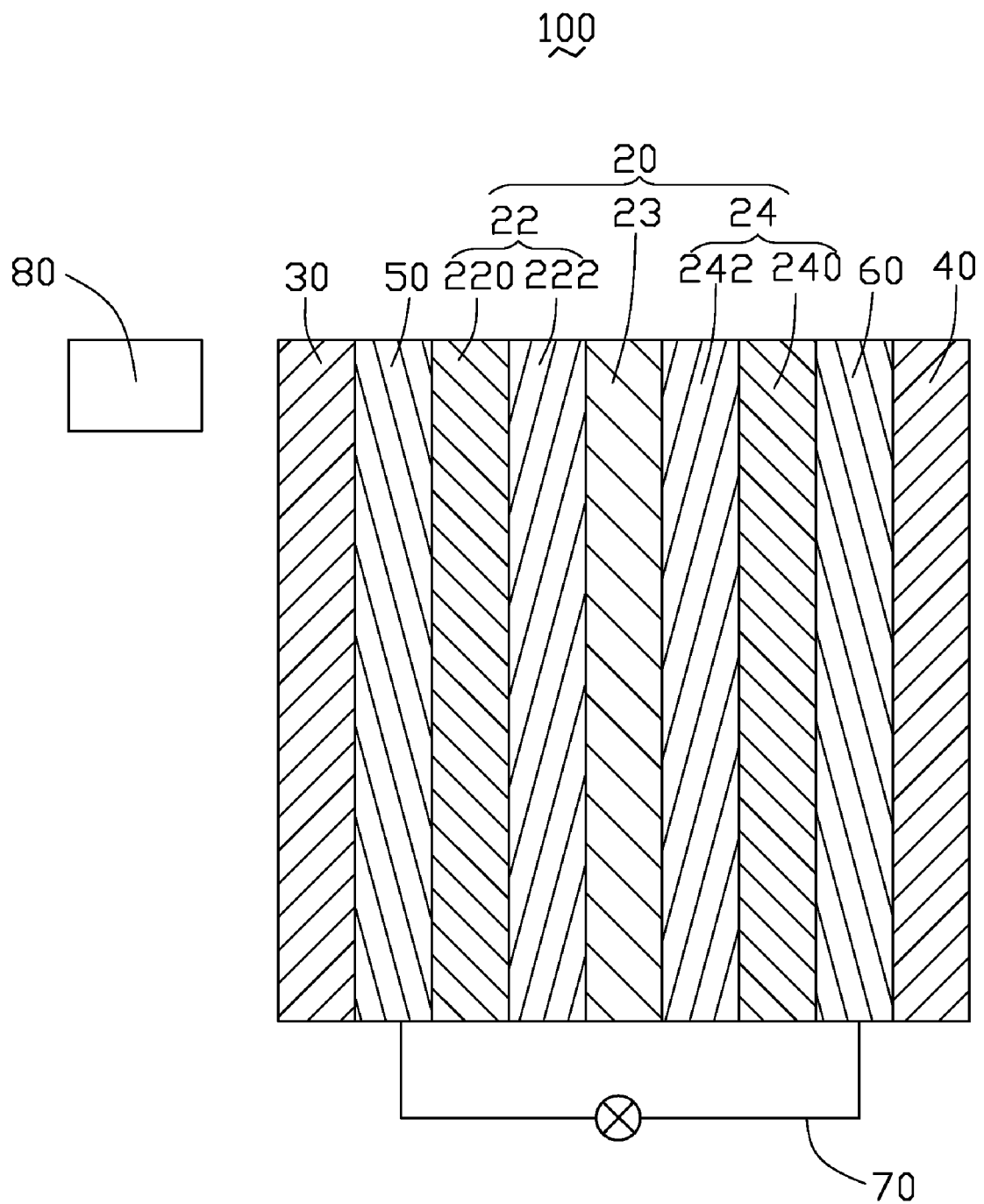
FIG. 1 is a schematic view of a proton exchange membrane fuel cell in accordance with an exemplary embodiment.

Referring to FIG. 1, a proton exchange membrane fuel cell 100, in accordance with an exemplary embodiment, includes a membrane electrode assembly 20, a first end plate 30, a second end plate 40, a first bipolar plate 50, and a second bipolar plate 60. The first and second bipolar plates 50, 60 are arranged at opposite sides of and in contact with the membrane electrode assembly 20. In alternative embodiments, the first and second bipolar plates 50, 60 can be adjacent to the membrane electrode assembly 20 but not necessarily in contact with the membrane electrode assembly 20. The first and second end plates 30, 40 are arranged at opposite sides of the membrane electrode assembly 20, in contact with the first and second bipolar plates 50, 60, respectively. In alternative embodiments, the first and second end plates 30, 40 can be adjacent to the first and second bipolar plates 50, 60 but not necessarily in contact with the first and second bipolar plates 50, 60.

The membrane electrode assembly 20 includes a proton exchange membrane 23, an anode 22, and a cathode 24. The anode 22 and the cathode 24 are arranged at opposite sides of the proton exchange membrane 23. The anode 22 includes a first gas diffusion electrode media 220 arranged adjacent to the first bipolar plate 50, and a first catalyst layer 222 formed on the first gas diffusion electrode media 220 and contacting the proton exchange membrane 23. Similarly, the cathode 24 includes a second gas diffusion electrode media 240 arranged adjacent to the second bipolar plate 60, and a second catalyst layer 242 formed on the second gas diffusion electrode media 240 and contacting the proton exchange membrane 23. Each of the first and second gas diffusion electrode medias 220, 240 is a thin and porous carbon fiber paper. A material of the proton exchange membrane 23 is generally perfluoro sulfonate, polystyrene sulfonic acid, or hydrocarbon, etc. In the present embodiment, the proton exchange membrane 23 is a perfluoro sulfonated membrane.

The first catalyst layer 222 is a mixture of photo-catalyst and noble metal. The photo-catalyst accounts for the total weight of the first catalyst layer 222 in a range from 30% to 35%, and the noble metal accounts for the total weight of the first catalyst layer 222 in a range from 65% to 70%. A material used for the photo-catalyst can be selected from the group consisting of titanium dioxide ($TiO_2$), zinc oxide (ZnO), tin oxide ($SnO_2$), zirconium dioxide ($ZrO_2$), cadmium sulfide (CdS), etc. The noble metal can be selected from platinum, gold, and a ruthenium group metal or alloy. In the present embodiment, the photo-catalyst is made of titanium dioxide ($TiO_2$), and the noble metal is platinum. Generally, the second catalyst layer 242 is made of a platinum group metal or alloy.

The first end plate 30 is made of light-pervious material, such as plastic. Preferably, a material used for the first end plate 30 is selected from the group consisting of polymethyl methacrylate (PMMA), polycarbonate, and dially glycol carbonates. The second end plate 40 generally is made of metal.

Figure 2:
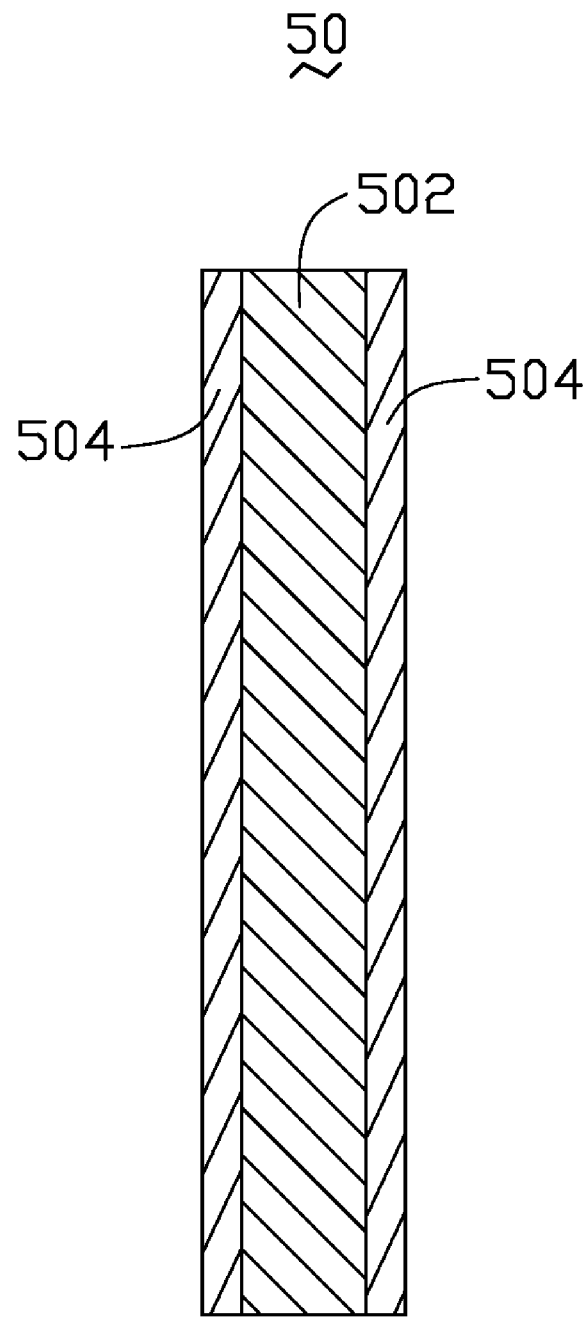
FIG. 2 is a schematic view of a first bipolar plate of the proton exchange membrane fuel cell of FIG. 1.

The first and second bipolar plates 50, 60 are arranged between the first and second end plates 30, 40. That is, the first bipolar plate 50 is arranged between the membrane electrode assembly 20 and the first end plate 30, and the second bipolar plate 60 is arranged between the membrane electrode assembly 20 and the second end plate 40. The first bipolar plate 50 is made of light-pervious material. As shown in FIG. 2, the first bipolar plate 50 includes a plastic substrate 502 and a transparent conductive film 504 formed on opposite sides of the plastic substrate 502. Preferably, the plastic substrate 502 is made of PMMA, and the transparent conductive film 504 is made of material such as indium tin oxide (ITO) or indium zinc oxide (IZO). Generally, the second bipolar plate 60 is made of graphite, carbon composite, or metal (such as nickel).

In an exemplary embodiment for the purposes of illustrating operation of the proton exchange membrane fuel cell 100, a fuel such as hydrogen is fed through the first bipolar plate 50 to the anode 22. On the anode 22, the hydrogen diffuses through the first gas diffusion electrode media 220 to the first catalyst layer 222, and then dissociates into protons and electrons. The protons are conducted through the proton exchange membrane 23 to the second catalyst layer 242 of the cathode 24. The electrons are electrically connected to an external circuit 70 to travel in the external circuit 70 for supplying electric current. On the cathode 24, an oxidant, such as oxygen, is supplied to react with the electrons (which have traveled through the external circuit 70) and protons to form water on the second catalyst layer 242. Finally, chemical energy is converted into usable electric energy. In this embodiment, the only waste product is water, either in liquid or vapor form or both. In addition to this pure hydrogen type of proton exchange membrane fuel cell 100, hydrocarbon fuels can be applied to the proton exchange membrane fuel cell 100. Such hydrocarbon fuels include diesel, methanol, and chemical hydrids. The waste products of these types of hydrocarbon fuels are carbon dioxide and water.

The first end plate 30 and the first bipolar plate 50 are made of light-pervious material. Therefore, ultraviolet (UV) light from the sun or a man-made light source (such as a UV light emitting diode) can be used to transmit through the first end plate 30 and the first bipolar plate 50 to the first catalyst layer 222 via the thin and porous first gas diffusion electrode media 220. The first catalyst layer 222 absorbs the UV light, and electron-hole pairs are excited from within the first catalyst layer 222 to a surface thereof. The electron-hole pairs dissociate the fuel into protons and electrons on the first catalyst layer 222. Thus the proton exchange membrane fuel cell 100 can have a high electric conversion efficiency.

The proton exchange membrane fuel cell 100 can further include a gas density meter 80, such as an infrared gas density meter 80, to measure a gas density of the fuel fed to the anode 22. The infrared gas density meter 80 is positioned at a side of the first end plate 30 away from the first bipolar plate 50. In operation, infrared (IR) light is emitted from the infrared gas density meter 80 and transmits through the light-pervious first end plate 30 to the first bipolar plate 50. The gas density of the fuel is measured in real time by detecting how much IR light is absorbed by the fuel. Thus, an optimum amount of fuel can be controlled to be fed to the anode 22, based on the gas density measured by the infrared gas density meter 80. Accordingly, the proton exchange membrane fuel cell 100 can achieve stable fuel conversion during operation.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A proton exchange membrane fuel cell, comprising:
a light-pervious first end plate and a second end plate;
a light-pervious first bipolar plate adjacent to the first end plate and capable of transmitting light having a given wavelength therethrough;
a second bipolar plate capable of having oxidant fed therein; and
a membrane electrode assembly comprising:
a proton exchange membrane, and
an anode and a cathode arranged adjacent to opposite sides of the proton exchange membrane, with the anode adjacent to the first bipolar plate and the cathode adjacent to the second bipolar plate, and the anode capable of having fuel fed therein and comprising a first catalyst layer containing photo-catalyst and noble metal such that the light is capable of activating the first catalyst layer to dissociate the fuel thereon.

2. The proton exchange membrane fuel cell of claim 1, wherein the first catalyst layer is a mixture of the photo-catalyst and the noble metal, the photo-catalyst accounts for a total weight of the first catalyst layer in a range from 30% to 35%, and the noble metal accounts for the total weight of the first catalyst layer in a range from 65% to 70%.

3. The proton exchange membrane fuel cell of claim 1, wherein the photo-catalyst is comprised of material selected from the group consisting of $TiO_2$, $SnO_2$, ZnO, CdSe, and CdS.

4. The proton exchange membrane fuel cell of claim 1, wherein the noble metal is selected from the group consisting of platinum, gold, a ruthenium group metal, and a ruthenium group alloy.

5. The proton exchange membrane fuel cell of claim 1, wherein the first bipolar plate comprises a plastic substrate and a transparent conductive film formed on the plastic substrate.

6. The proton exchange membrane fuel cell of claim 5, wherein the plastic substrate is made of polymethyl methacrylate.

7. The proton exchange membrane fuel cell of claim 5, wherein the transparent conductive film is made of one of indium tin oxide and indium zinc oxide.

8. The proton exchange membrane fuel cell of claim 1, wherein the first end plate is comprised of material selected from a group consisting of polymethyl methacrylate, polycarbonate, and dially glycol carbonates.

9. The proton exchange membrane fuel cell of claim 1, further comprising a gas density meter arranged at a side of the first end plate away from the first bipolar plate, wherein the first bipolar plate is capable of having the fuel fed therein before the fuel reaches the anode, and the gas density meter is configured for detecting a gas density of the fuel fed in the first bipolar plate in real time.

10. The proton exchange membrane fuel cell of claim 1, wherein the cathode comprises a second catalyst layer for promoting reaction of the dissociated fuel with the oxidant thereon.

11. The proton exchange membrane fuel cell of claim 10, wherein the second catalyst layer is made of one of a platinum group metal and a platinum group alloy.

12. The proton exchange membrane fuel cell of claim 1, wherein the second bipolar plate is made of material selected from the group consisting of graphite, carbon composite, and metal.

13. The proton exchange membrane fuel cell of claim 1, wherein the second end plate is made of metal.

14. The proton exchange membrane fuel cell of claim 1, wherein the anode is in contact with the first bipolar plate.

15. The proton exchange membrane fuel cell of claim 1, wherein the cathode is in contact with the second bipolar plate.

16. The proton exchange membrane fuel cell of claim 1, wherein the anode further comprises a porous gas diffusion electrode media, the first catalyst layer being formed on the porous gas diffusion electrode media.

17. The proton exchange membrane fuel cell of claim 16, wherein the porous gas diffusion electrode media comprises carbon fiber paper.

18. A proton exchange membrane fuel cell, comprising:
a light-pervious first end plate and a second end plate;
a light-pervious first bipolar plate adjacent to the first end plate and capable of transmitting light having a given wavelength therethrough;
a second bipolar plate adjacent to the second end plate and capable of having oxidant fed therein; and
a membrane electrode assembly comprising:
a proton exchange membrane,
an anode and a cathode arranged at opposite sides of the proton exchange membrane, with the anode in contact with the first bipolar plate and the cathode in contact with the second bipolar plate, and the anode capable of having fuel fed therein and comprising a first catalyst layer containing photo-catalyst and noble metal such that the light is capable of activating the first catalyst layer to dissociate the fuel thereon.

19. The proton exchange membrane fuel cell of claim 18, wherein the first catalyst layer is a mixture of the photo-catalyst and the noble metal, the photo-catalyst accounts for a total weight of first catalyst layer in a range from 30% to 35%, and the noble metal accounts for the total weight of the first catalyst layer in a range from 65% to 70%.

20. The proton exchange membrane fuel cell of claim 18, wherein the noble metal is selected from the group consisting of platinum, gold, a ruthenium group metal, and a ruthenium group alloy.

* * * * *